Feb. 19, 1929.
C. K. MORSE
1,702,613
PROCESS OF SEPARATING OIL FROM WATER AND REFUSE MATERIALS
Filed Dec. 20, 1926
*Fig. 1,*
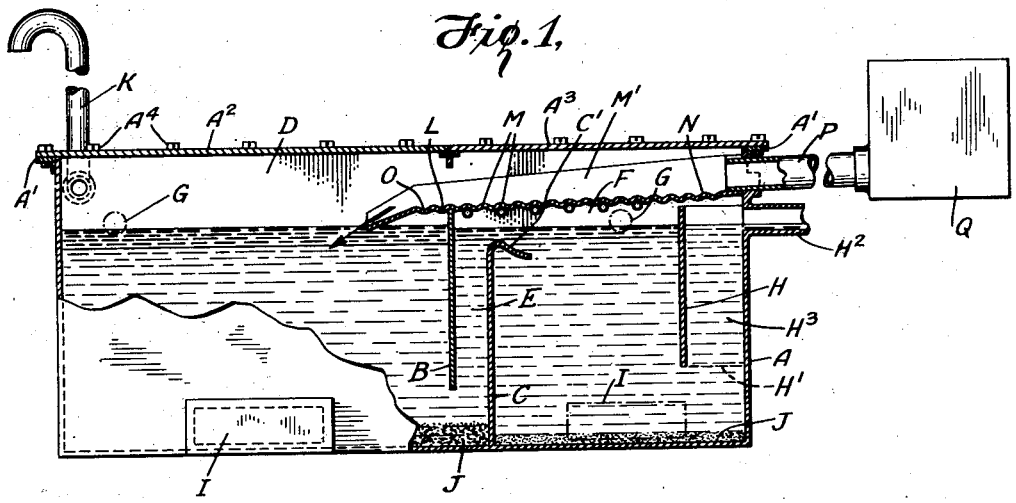
*Fig. 2.*
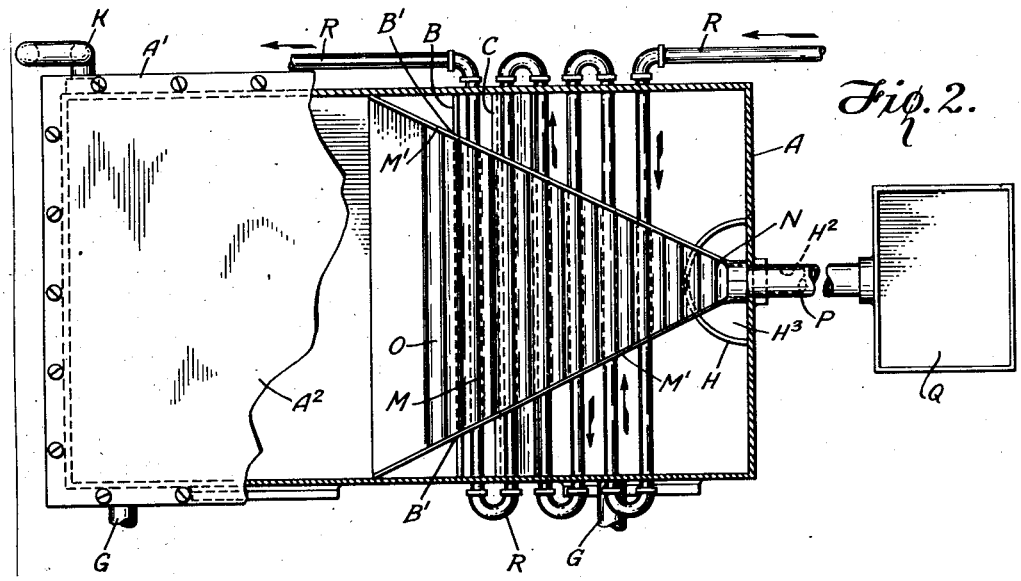
INVENTOR
Carl K. Morse
BY
ATTORNEY Patented Feb. 19, 1929.

1,702,613

UNITED STATES PATENT OFFICE.

CARL K. MORSE, OF GREENWICH, CONNECTICUT, ASSIGNOR TO ELEANOR H. MORSE, OF GREENWICH, CONNECTICUT.

PROCESS OF SEPARATING OIL FROM WATER AND REFUSE MATERIALS.

Application filed December 20, 1926. Serial No. 155,895.

My invention relates to oil separating processes, such as separating oil and grease from water, and granular substances coated with oil or grease.

The object of my invention is to provide a process for separating oil from water or from substances coated with or holding oil in its interstices.

In carrying out my process I employ mechanical means which permits the oil to be separated from the other matter in which it is held, or with which it is mixed, in a continuous automatic process which requires little attention and may be operated by unskilled persons. By this process the dirt particles covered with oil are practically washed by the water, the oil separating from the refuse material and rising to the top of the water in the chambers, where it can be drawn from the tank through the outlet openings provided.

Referring to the drawings by means of which I carry out my process:

Fig. 1 is a longitudinal sectional view of an oil separating apparatus embodying my invention.

Fig. 2 is a plan view thereof, the cover being partly removed for purposes of this description.

A indicates a tank of sheet metal, rectangular in form and having a length about twice that of its width, as constructed for general use in garages, etc. The depth of the tank is about equal to that of its width. It is provided with a flange $A^1$ which extends entirely around the upper edge of the tank and with a cover comprising two portions $A^2$ and $A^3$ respectively, bolted to said flange by bolts $A^4$. The tank is equipped with two partitions B and C respectively, the partitions extending entirely across the tank. The partition B extends from the top downward nearly to the bottom thereof as illustrated and the partition C extends from the bottom upwardly about two-thirds the height of the tank and spaced from the partition B to form a conduit E through which water and any entrained oil may flow from chamber D to chamber F. The top of the partition C is provided with an apron extension $C^1$ to prevent surging of the fluid in the chamber.

The tank is provided with two outlets for oil indicated by G and located in longitudinal alignment with each other, the lower edges of which are located a short distance above the top of partition C. An outlet for water is provided comprising a circular partition H which extends from a point above the outlets G downward to the bottom opening $H^1$, providing an outlet conduit $H^3$ and a piped outlet $H^2$, the bottom of which is located in alignment with the bottom of outlet openings G.

The tank is further provided with doors I—I respectively for access in cleaning out the tank when sediment has been deposited therein from time to time, the sediment being indicated by letter J. K indicates a gas release pipe which is connected to the tank on one side thereof and extends well above the top, and also serves to prevent water or oil from overflowing in event of excess flow to the chamber D from the source of supply. The partition B is cut away across the middle of its top and the lower end of a triangular shaped table L rests on its top between the higher end walls at $B^1$. The lower end of this table extends entirely across the track and rests at or below the bottom line of the outlet pipe $H^2$. This table is preferably made of galvanized iron, the corrugations M extending transversely and measuring about ¾ of an inch from centre to centre of same, and the table is inclined about one inch per foot from the top end N to the bottom corrugation O, and is further provided with side walls or flanges $M^1$. An inlet pipe P extends through the rear wall of the casing near its top, the lower portion resting in the upper end of the table M as illustrated. A sump Q empties into the pipe P. A steam pipe R extends through the side walls of the tank and is arranged in return bend form and the table rests on the pipe and is heated by steam flowing in the direction indicated by the arrow in Figure 2, thus the water of condensation will readily flow to the outlet steam trap (not shown) located at the lower end of the pipe R.

The operation is as follows:

Water, oil, dirt and grease are deposited in the sump Q, the water content carrying the oil, grease and dirt through pipe P to the table M, where its flow in volume is checked by the corrugations, causing it to flow laterally in the same until it overflows to the next lower corrugation where it is spread over a greater area and the oil separates from the water as it surges and passes over the table and when it reaches the tank chamber D, the water fills the tank until it overflows through conduit E into chamber F and therefrom through conduit H³ and outlet H² to a drain. The surge of the water entering chamber D causes the water to rise to a slightly greater height in conduit E, helped also by the weight of oil resting on the surface of the water in chamber D. The oil is carried away when it reaches the outlet G in either chamber, the oil reaching chamber F being that entrained with the flowing water and rising from the sediment carried to the bottom of the chambers. Instead of using a corrugated table I may use any other form that will spread the water and agitate the refuse material while obstructing the rapid flow over its surface, such as raised or embossed ribs formed in the bottom of the table, but I prefer the corrugated form as it is easy to obtain and relatively low in cost.

Where the oil is heavy and in cold weather, I prefer to use the steam while operating the device, as the oil separates faster and thus the device is more efficient. The apparatus is entirely automatic in action and has been found in actual practice to work successfully, practically all of the oil and grease being recovered from the sludge.

Having thus described my invention what I claim as new is:

1. The process of separating oil from refuse or other material with which it is mixed consisting in adding water to the mixture prior to its introduction into a separating tank to provide a fluid and spreading the fluid in increasing ratio as it flows, and leading said fluid to a tank in which the oil separates from the water and refuse and floats to the surface of the water, then leading the oil and water from said tank through separate outlets.

2. The process of separating oil from refuse or other material with which it is mixed consisting in adding water to the mixture to provide a freely flowing fluid, then spreading the fluid in increasing ratio to provide a shallow slow flowing stream while heating the same to separate the oil therefrom and leading the oil to a reservoir and the water to another place.

3. The process of separating oil from refuse or other material with which it is mixed consisting in adding water to the mixture to provide a freely flowing fluid, then continuously spreading and retarding the fluid to cause the oil to float to the surface of the mixture, then separating the mixture from the oil by causing it to flow onto the surface of a separate body of water and then leading the oil obtained from the mixture to a reservoir.

4. The process as set forth in claim 3 with the added step of heating the mixture while the same is being retarded and spread in a stream of shallow depth.

5. The process of separating oil from refuse or other material with which it is mixed consisting in adding water to the mixture to provide a freely flowing fluid and continuously spreading the fluid while heating the same as it flows and leading said fluid to a tank in which the oil separates from the water and refuse and floats on the surface of the water, then leading the oil and water from said tank through separate outlets.

In testimony whereof I have affixed my signature.

CARL K. MORSE.